UNITED STATES PATENT OFFICE.

STAFFORD A. McMINN, OF LONDON, ENGLAND.

REFRACTORY CEMENT.

1,341,510. Specification of Letters Patent. Patented May 25, 1920.

No Drawing. Application filed March 9, 1920. Serial No. 364,546.

*To all whom it may concern:*

Be it known that I, STAFFORD ALEXANDER MCMINN, a subject of the King of Great Britain, residing at North Woolwich, London, England, have invented a certain new and useful Improvement in Refractory Cement, of which the following is a specification.

This invention has for its object the provision of a cement or composition of an adhesive nature, for use in lining the interior surfaces of gas retorts or furnaces, constructed of fireclay. The essential feature of the invention is the admixture of a proportion of ground or powdered glass, with the fireclays ordinarily in use; *e. g.* Stourbridge, silica, or china clay, and the like. Preferably this percentage does not exceed 50%, and is governed by the quality of the ground glass obtainable. If this is of good quality and free from flint, a percentage of 33% is quite suitable, but if the ground glass contains flint or other foreign matter, then the percentage used is increased to say 42%. For use where higher temperatures obtain, as in the furnaces and combustion chambers of retort settings, I propose to form the cement of a mixture of the silica clay, (*i. e.* clay containing over 90% of silica) with china clay and ground glass, in approximately equal proportions. In any case the cement may be applied to the finished retorts, either old or new as described or may be applied to the retorts before they are fired in the process of their manufacture.

The fireclay is first well mixed dry in a mill, with the required proportions of powdered glass, when it is ready for use.

The composition is then mixed to the required consistency with a sufficient quantity of clean water, so as to form a plastic mass; this is then applied when the retorts are cold, being rendered on them by means of a bricklayer's trowel to any required thickness. After the heats are raised to the required temperature of say 1700° to 2000° Fahrenheit, the cement adheres firmly to the retort and sets hard.

Having now described my invention, what I claim as new, and desire to secure by Letters Patent, is:—

1. A cement composition containing not less than 33% and not more than 50% of powdered glass together with fireclay.

2. A cement composition containing not less than 33% of powdered glass together with fireclay and china clay.

3. A furnace lining composition containing silica clay, china clay and ground glass in substantially equal proportions.

4. A furnace lining composition having as its essential ingredients fireclay containing more than 90% of silica, china clay and ground glass in substantially equal proportions.

In witness whereof I have hereunto set my hand.

S. A. McMINN.